United States Patent
Iijima et al.

(10) Patent No.: US 6,582,671 B1
(45) Date of Patent: Jun. 24, 2003

(54) METHOD FOR REDUCING OXYGEN CONTENT IN A BOILER EXHAUST GAS

(75) Inventors: Masaki Iijima, Tokyo (JP); Tetsuya Imai, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/074,607

(22) Filed: May 8, 1998

(30) Foreign Application Priority Data

Jul. 16, 1997 (JP) ................................. 9-190924

(51) Int. Cl.[7] ........................ B01D 53/46; C01B 21/02
(52) U.S. Cl. ................ 423/219; 423/351; 423/437.1
(58) Field of Search .................. 423/351, 219, 423/245.3, 239.1, 437.1

(56) References Cited

U.S. PATENT DOCUMENTS

| | | | |
|---|---|---|---|
| 3,353,921 A | * 11/1967 | Hirt | 23/281 |
| 3,556,059 A | * 1/1971 | Gorzegno et al. | 122/406 |
| 4,010,238 A | * 3/1977 | Shiraishi et al. | 423/239 |
| 4,895,710 A | * 1/1990 | Hartmann et al. | 423/351 |
| 4,988,490 A | * 1/1991 | Nicholas et al. | 423/351 |
| 5,260,043 A | * 11/1993 | Li et al. | 423/239.02 |
| 5,320,818 A | * 6/1994 | Garg et al. | 423/351 |
| 5,456,064 A | 10/1995 | Graves | 60/276 |

FOREIGN PATENT DOCUMENTS

| | | | |
|---|---|---|---|
| CH | 88100589 | 9/1988 | |
| EP | 0598384 A1 | * 5/1994 | ................. 423/219 |
| GB | 2265555 A | 10/1993 | |
| JP | 54-126690 A | * 10/1979 | ................. 423/351 |
| JP | 58-147565 A | * 9/1983 | ................. 423/219 |
| JP | 5-96168 A | * 4/1993 | ............. 423/245.3 |
| JP | 6-205973 A | * 7/1994 | ............. 423/245.3 |
| SU | 965991 | * 10/1982 | ................. 423/351 |

OTHER PUBLICATIONS

Marzo Et Al., "Destroy $No_x$ Catalytically" Hydrocarbon Proc. vol. 59. No. 2 pp. 87–89, Feb. 1980.*

"Boiler and Appartus for Boiler House"; Jun. 1995.

* cited by examiner

Primary Examiner—Stanley S. Silverman
Assistant Examiner—Timothy C. Vanoy
(74) Attorney, Agent, or Firm—Birch, Stewart, Kolasch & Birch, LLP

(57) ABSTRACT

A process is provided for producing a nitrogen gas, useful in the petroleum industry, by combusting fuel with air in a "once through"-type boiler and injecting a supplemental fuel, such as natural gas, into the exhaust gas at a location just before a combustion catalyst that promotes the reaction between this supplemental fuel and the residual oxygen present in the exhaust gas. This oxygen-diminished, exhaust gas is then passed through a heat exchanger, where it transfers its heat to the air entering the boiler.

14 Claims, 1 Drawing Sheet

METHOD FOR REDUCING OXYGEN CONTENT IN A BOILER EXHAUST GAS

BACKGROUND OF THE INVENTION

Field of the Invention

The present invention relates to an apparatus and a method for reducing oxygen content in a boiler exhaust gas.

It has been a conventional practice to press nitrogen gas into an oil field to maintain the pressure of an oil reservoir or to dissolve nitrogen gas in oil to form a so-called miscible condition, thereby heightening the fluidity of the oil in an oil reservoir.

Here, as a nitrogen gas source, nitrogen gas separated from oxygen by the low temperature processing of air is employed. The separation of nitrogen gas, however, requires a tremendous power and furthermore, the cost of the apparatus is markedly high.

There is accordingly a demand for countermeasures for obtaining nitrogen gas at a low power and a low cost.

SUMMARY OF THE INVENTION

An object of the present invention is therefore to provide an apparatus and a method for reducing oxygen content in a boiler exhaust gas, which makes it possible to prepare nitrogen gas at a low power and a low cost.

In accordance with the present invention, the above-described object is attained by an apparatus for reducing oxygen content in a boiler exhaust gas, which comprises a combustion catalyst portion disposed downstream or at the intermediate portion of a convectional heat transfer portion of a boiler and a fuel supply apparatus for supplying an oxygen reducing fuel to a position just before said catalyst combustion portion.

The present invention includes a method for reducing oxygen content in an exhaust gas from a boiler, which comprises supplying an oxygen reducing fuel to the exhaust gas at just before a combustion catalyst portion disposed downstream or at the intermediate portion of a convectional heat transfer portion of the boiler, burning said oxygen reducing fuel at said combustion catalyst portion to increase $CO_2$ content and reduce oxygen gas content, to thereby obtain an exhaust gas which is composed mainly of nitrogen gas with an oxygen gas concentration not greater than 1,000 ppm.

DETAILED DESCRIPTION OF THE PREFERRED EMBODIMENT

Figure 1:
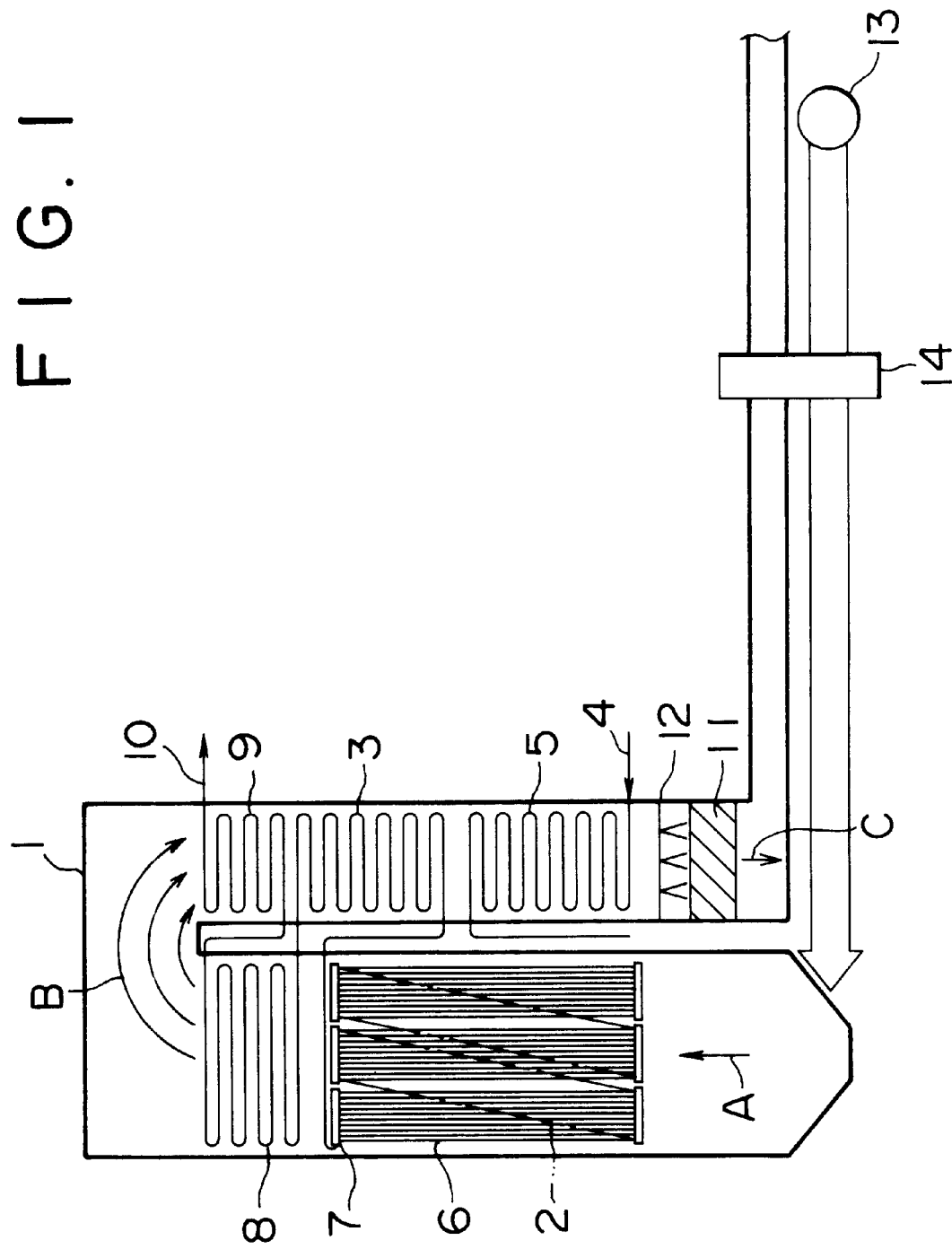
FIG. 1 is a schematic view illustrating one embodiment of a once-through boiler including an apparatus of the present invention for reducing oxygen content in an exhaust gas of the boiler.

The embodiment of the present invention will next be described with reference to the accompanying drawing.

FIG. 1 illustrates an embodiment of a boiler unit including an apparatus for decreasing oxygen content in a boiler exhaust gas according to the present invention.

The boiler 1 to which this embodiment has been applied is a so-called once-through type boiler. The heat transfer system of the boiler 1 is generally equipped with an evaporating portion which is divided into two parts. One of the evaporating portions is a radiation evaporator 2 and the other one is a residue evaporator 3.

In the heat transfer system of the boiler 1, water is fed from a water supply port 4 through a pre-heater (not illustrated) and then sent to a radiation evaporator 2 through a fuel economizer 5. The radiation evaporator 2 has many water pipes 6 arranged in parallel. Confluence and branching of water are repeated at a header 7 disposed in the midway, whereby the water flow in each water pipe is made uniform. About 85% of the water so supplied is evaporated at the radiation evaporator 2 by the combustion heat of a boiler fuel, while evaporation of the remaining portion of water and partial heating (by convectional heat transfer) are carried out at the subsequent residue evaporator 3. Most of the impurities in the supplied water adheres to the inside wall of the pipe of the residue evaporator 3 so that the residue evaporator is housed in a gas duct of a low gas temperature in order to protect it from overheating. The steam then passes through a radiation superheater 8 and a convection superheater 9, is taken out from a superheated steam outlet 10 and then fed to a generating turbine and heating system (not illustrated) in the subsequent stage.

Incidentally, arrows A, B and C in FIG. 1 indicate the flow of a combustion gas (A, B) and an exhaust gas (C), respectively.

The above-described radiation evaporator 2 and radiation superheater 8 form the boiler radiation portion, which is a relatively high-temperature portion. On the other hand, the convection superheater 9, residue evaporator 3 and fuel economizer 5 form the convectional heat transfer portion of a boiler which is a relatively low-temperature portion.

The above-described radiation evaporator 2 is in the shape of a riser tube group-down corner, but a one-through type boiler using a so-called meander type or spiral type evaporator does not impair the object of the present invention.

The above-described heat transfer system (water supplying system) and combustion of a boiler fuel are controlled by an automatic controller which is not illustrated.

The embodiment of the present invention as illustrated in FIG. 1 further comprises a combustion catalyst portion 11 and a fuel supply apparatus 12, which form a main portion of the oxygen reducing apparatus according to the present invention.

The combustion catalyst portion 11 is disposed downstream of the convectional heat transfer portion of the boiler as illustrated in FIG. 1. Examples of the catalyst used for the combustion catalyst portion 11 include those containing a metal belonging to elements of the platinum group and oxides thereof. The catalysts as shown below can be used, for example.

(1) A catalyst obtained by coating powders onto a heat-resistant base such as cordierite, said powders being prepared by having at least one active component selected from platinum, palladium and rhodium borne on a carrier containing at least one oxide selected from the group consisting of alumina, silica, titania and zirconia.

(2) A catalyst obtained by adding to the above-described catalyst at least one oxide selected from the group consisting of oxides of an alkaline earth element and oxides of a rare earth element as a co-catalyst.

(3) A catalyst containing at least one substance selected from the group consisting of metals such as copper, vanadium, chromium, iron and nickel and oxides thereof.

Concerning the amount of the catalyst, when the amount of an exhaust gas is set at 1,600,000 $Nm^3/H$ (corresponding to a 600 MW boiler), the amount of the catalyst is 16 M³. When the amount of the catalyst is smaller than the above amount, combustion is not accelerated sufficiently, while use in an excess is uneconomical.

The temperature of the boiler exhaust gas fed to the combustion catalyst portion 11 is preferably 150 to 350° C. The temperature of the exhaust gas at the combustion catalyst portion 11 is preferably 300 to 500° C., more preferably 350 to 500° C.

The combustion catalyst portion 11 can be disposed downstream of the convectional heat transfer portion of the boiler as illustrated in the embodiment of FIG. 1. Alternatively, it may be disposed at the intermediate part of the convectional heat transfer portion of the boiler insofar as it satisfies the exhaust gas temperature as described above.

The fuel supply apparatus 12 is an apparatus for supplying the combustion catalyst portion 11 with an oxygen reducing fuel and it is disposed at the position just before the combustion catalyst portion 11. In the present invention, a reduction in the concentration of the oxygen in the exhaust gas generally containing 2 to 3 vol. % of oxygen to 1,000 ppm or less by secondary combustion at the combustion catalyst portion 11 is aimed at. Accordingly, it is suited to add a natural gas (composed mainly of $CH_4$) in an amount of 16,000 to 20,000 $Nm^3/H$ when the amount of the exhaust gas is set at 1,600,000 $Nm^3/H$ (corresponding to a 600 MW boiler). In other words, an amount falling within a range of from (an exhaust gas amount)$\times 10^2$ to $1.25\times$(an exhaust gas amount) $10^2$ $Nm^3/H$ is suited. An oxygen amount contained in an exhaust gas is generally 2 to 3 vol. %, so that amounts smaller than the above range do not permit the sufficient oxygen reduction. When the amount exceeds the above range, a natural gas is contained in an exhaust gas as a unburnt portion, but there is nothing inconvenient if the gas is pressed into the oil field. An injection apparatus known to those skilled in the art can be used as the fuel supply apparatus 12.

Incidentally, in the boiler equipped with the oxygen reducing apparatus according to the present invention, the temperature increases at the combustion catalyst portion 11. An air heater 14 is therefore disposed in order to carry out heat exchange between the exhaust gas and the air from an air suction blower 13. As the air heater 14, a heat exchange type free of air leakage is preferred.

Through the air heater 14, a dehydrator (not illustrated), a compressor (not illustrated) and the like, the exhaust gas is transferred to a place where it is used.

In the oxygen reducing apparatus according to this embodiment, oxygen in the exhaust gas is reduced and a $CO_2$ content is increased by the combustion of the oxygen reducing fuel. The heat generated here is made use of by the air heater 14 to heat the air for primary combustion. Similar to other apparatus, these apparatus are automatically controlled properly by a control portion which is not illustrated.

By using the oxygen reducing apparatus according to this embodiment in a manner as described above, an exhaust gas substantially free of oxygen can be obtained at by far lower power and lower cost compared with that obtained by the low temperature processing. In addition, the exhaust gas so obtained has a larger $CO_2$ content than the ordinary exhaust gas owing to the secondary combustion by the oxygen reducing apparatus. $CO_2$ is more effective than nitrogen gas when pressed into an oil field.

When the boiler exhaust gas after the primary combustion is pressed as is into the oil reservoir of an oil field, clogging of the oil reservoir and marked corrosion of an oil well or production equipment proceed owing to the remaining oxygen. On the other hand, an exhaust gas attainable by the present invention contains little, if any, oxygen but contains primarily $CO_2$ so that it exhibits great effects when pressed into an oil field. In other words, by pressing a $CO_2$-rich nitrogen gas obtained according to the present invention into an oil field, the pressure of the oil reservoir can be maintained and fluidity of the oil in the oil reservoir can be heightened markedly.

Other Embodiments

The apparatus for reducing oxygen content in a boiler exhaust gas and the method using the apparatus, each according to the present invention, are not limited to the above-described embodiment but can be subjected to various modifications within a range of the technical idea of the present invention.

The boiler shown in FIG. 1 is a so-called Benson boiler, but the present invention can be applied to other once-through boilers such as a Zulzer boiler. The present invention can also be applied to boilers other than the once-through boilers insofar as they do not depart from the object of the present invention.

Working Example

Example 1

In a once-through boiler having an exhaust gas amount of 1,600,000 $Nm^3/H$, a Pt catalyst (having platinum, as an active ingredient, borne on silica and being coated on a cordierite base) was disposed, as a combustion catalyst portion, downstream of the convectional heat transfer portion of the boiler.

The amount of the catalyst was set at 16 $m^3$.

The temperature of the exhaust gas supplied to the combustion catalyst portion was 200° C. and the gas had the following compositions:

$N_2$: 73%, $CO_2$: 9%, $H_2O$: 16%, $O_2$: 2%

A natural gas (composed mainly of $CH_4$) was added as an oxygen reducing fuel in an amount of 16,000 $Nm^3/H$.

As a result of combustion at the combustion catalyst portion, the gas composition showed a change as follows:

$N_2$: 73%, $CO_2$: 10%, $H_2O$: 17%, $O_2$: (not detected)

Combustion temperature was 400° C.

As described above, a $CO_2$-rich nitrogen gas free of oxygen can be obtained in large amounts only by supplying a slight amount of the oxygen reducing fuel, whereby effectiveness of the present invention has been confirmed.

The disclosure of Japanese Patent Application No. 9-190924 filed on Jul. 16, 1997 including specification, claims, drawings and summary are incorporated herein by reference in its entirety.

What is claimed is:

1. A method for reducing oxygen content in an exhaust gas from a boiler, comprising:
   supplying an oxygen reducing fuel to the exhaust gas at just before a combustion catalyst portion disposed downstream or at the intermediate portion of a convectional heat transfer portion of the boiler,
   burning said oxygen reducing fuel at said combustion catalyst portion to increase a $CO_2$ content and reduce an oxygen gas content of an exhaust gas, thereby obtaining an exhaust gas which is comprised mainly of nitrogen gas and has an oxygen gas concentration not greater than 1,000 ppm, and
   transferring heat, using a heat exchange device that is free of air leakage, from the obtained exhaust gas to air supplied to an input of the boiler to thereby increase the efficiency of the removal of oxygen from the gas.

2. The method according to claim 1, in which the exhaust gas has passed through a boiler radiation heat transfer portion before passing to the convection heat transfer portion.

3. The method according to claim 1, in which the boiler is a once-through type gas heating boiler.

4. The method according to claim 1, in which the catalyst in the catalyst combustion portion is a catalyst obtained by coating powders onto a heat-resistant base of cordierite, said powders being prepared by having at least one active component selected from metallic platinum, metallic palladium and metallic rhodium borne on a carrier containing at least one oxide selected from the group consisting of alumina, silica, titania and zirconia.

5. The method according to claim 4, in which the catalyst in the catalyst combustion portion is a catalyst obtained by adding to the catalyst of claim 4 at least one oxide selected from the group consisting of oxides of an alkaline earth element and oxides of a rare earth element as a co-catalyst.

6. The method according to claim 1, in which the catalyst in the catalyst combustion portion is a catalyst containing at least one substance selected from the group consisting of copper, vanadium, chromium, iron and nickel and oxides thereof.

7. The method according to claim 1, in which the temperature of the exhaust gas fed to the combustion catalyst portion is 150 to 350° C.

8. The method according to claim 1, in which the temperature of the exhaust gas at the combustion catalyst portion is 300 to 500° C.

9. The method according to claim 1, in which the oxygen reducing fuel is a natural gas.

10. The method according to claim 9, in which the oxygen reducing fuel is provided at a rate falling within a range of from (an exhaust gas volume flow rate)$\times 10^2$ to $1.25 \times$(an exhaust gas volume flow rate) $10^2$ Nm$^3$/H.

11. A method of reducing the oxygen content of an exhaust gas from a boiler, comprising the steps of:

introducing an oxygen reducing fuel into the exhaust gas just before a combustion catalyst portion of the boiler, which portion is disposed downstream from or at the intermediate portion of a convectional heat transfer portion of the boiler; and burning the oxygen reducing fuel at the combustion catalyst portion to increase the concentration of $CO_2$ and to reduce the concentration of oxygen in the exhaust gas sufficiently to thereby obtain an exhaust gas which is composed primarily of nitrogen gas and which has an oxygen gas concentration that is not greater than 1,000 ppm.

12. The method according to claim 11, which further includes the step of transferring heat from the obtained low oxygen concentration exhaust gas to air that is to be supplied to the boiler to thereby increase the efficiency of the removal of oxygen from the gas.

13. The method according to claim 12, wherein the transfer of heat from the obtained low oxygen concentration exhaust gas is accomplished by the use of a heat exchange device that is free of air leakage to prevent any addition of oxygen gas to the cooled exhaust gas.

14. The method according to claim 13, wherein, the cooled, low oxygen concentration exhaust gas is supplied to an oil field for maintaining pressure levels in an oil reservoir and improving fluidity of crude oil in the reservoir.

* * * * *